Patented Aug. 7, 1934

1,969,269

UNITED STATES PATENT OFFICE 1,969,269

FURFURYL XANTHATE AND PROCESS OF MAKING IT

Cornelius H. Keller, San Francisco, Calif., assignor to Minerals Separation North American Corporation, New York, N. Y., a corporation of Maryland No Drawing. Application July 12, 1930, Serial No. 467,635

11 Claims. (Cl. 260—54)

This invention relates to substances useful in the flotation concentration of ores and to processes of making such substances, and is herein illustrated as embodied in a substance apparently consisting largely of furfuryl xanthate. This application is a continuation in part of my co-pending application Serial No. 391,701, filed September 10th, 1929.

Substantially equimolecular proportions of furfuryl alcohol, carbon disulphide and caustic alkali were mixed according to various procedures, and the products obtained by all the procedures were found equally useful in the froth-flotation concentration of ores. This was also found to be true of the product obtained when furfuryl alcohol was treated with carbon disulphide and metallic potassium under conditions parallel to the conditions which, with other alcohols, yield xanthates.

In the laboratory it has been found most convenient to prepare the desired product by causing the reactions to take place in the presence of a neutral liquid such as ether.

66 grams of 85% caustic potash, equivalent to about 56 grams of the pure potash, were dissolved in 72 cc. of distilled water and cooled to about 5° C. This solution was poured into a pre-cooled mixture of about 98 grams of furfuryl alcohol and 100 cc. of ether. To this mixed solution, which was kept between 5° and 10° C., were added, with constant stirring, over a period of an hour and one-half, about 76 grams of carbon disulphide.

At the end of this time the reaction products consisted of a mixture of reddish brown mother liquor with a light colored solid. The mixture of mother liquor and solid was found to be useful as a flotation agent.

The reaction product separated by crystallization from the mother liquor has been found to consist mainly of furfuryl xanthate. It has been found that the crude furfuryl xanthate can be prepared by the above described reactions with less than 10% of impurities and that these impurities were substantially inert in froth-flotation procedures.

The purified dry solid product for testing purposes was obtained separately by filtering in a suction filter, washing with ether, centrifuging, and drying in a vacuum over calcium chloride.

The product thus obtained was stable even when heated to 100° C., and impure products when properly dried were also relatively stable.

The purified product reacted in solution, as do xanthates when treated with an oxidizing agent such as iodine, to yield a brownish sulphur-containing oil which was found to be useful in the concentration of minerals by flotation. The solution also yielded an oil, unstable and strong smelling, when electrolyzed by a weak current. An oil was also obtained when the solution was treated with suitable salts of copper, lead or zinc, such as copper sulphate.

The reaction product apparently contained a substantial proportion of furfuryl xanthate and showed some reactions parallel to benzyl xanthate, in that it was incapable of being purified by crystallization from warm ethyl alcohol. In each case the xanthate of the higher alcohol which was dissolved in ethyl alcohol, was found to react with the warm solvent to produce higher alcohol and an ethyl xanthate. The higher alcohol thus obtained was found to be capable of being reconverted to its xanthate. The reaction product which contained furfuryl xanthate reacted with an aqueous solution of copper sulphate to yield a copper-containing precipitate. This precipitate changed rapidly from an initial canary yellow to orange, and contained more copper than that theoretically called for by cuprous furfuryl xanthate.

In aqueous solution the reaction product rapidly decomposed when treated with acid. The precipitates obtained by treating its solution with metallic salts also decomposed rapidly.

The reaction products obtained with different sulphur contents all proved about equally useful in the flotation concentration of the ores tested.

Having thus described certain embodiments of the invention, what is claimed is:

1. The product obtained by causing furfuryl alcohol, caustic alkali and carbon disulphide to react and produce a substance which responds to tests for xanthates.

2. The product obtained by causing caustic alkali and furfuryl alcohol to react with carbon disulphide, all in substantially the proportions suitable for the production of a xanthate.

3. The product obtained by causing an aqueous solution of a caustic alkali to react with furfuryl alcohol, and treating with carbon disulphide, all in substantially the proportions suitable for the production of a xanthate.

4. The product obtained by causing caustic potash to react with furfuryl alcohol and treating the product with carbon disulphide, all in substantially the proportions suitable for the production of a xanthate.

5. The process which consists in causing furfuryl alcohol, a caustic alkali, and carbon disulphide to react to yield a product which contains a substantial quantity of a xanthate.

6. The process which consists in causing furfuryl alcohol, a caustic alkali and carbon disulphide to react to yield a product which contains a substantial quantity of a xanthate, and treating the xanthate-containing substance with a mild oxidizing agent to yield an oil useful in flotation.

7. A substance containing a substantial amount of a compound including the radical of furfuryl xanthic acid, said substances being useful as a flotation agent and substantially dependent upon the presence of the furfuryl xanthic acid radical for its utility.

8. A substance consisting of a compound including the radical of furfuryl xanthic acid and dependent for its utility upon the presence of such furfuryl xanthic acid radical.

9. An alkali metal salt of furfuryl xanthic acid.

10. The process which consists in causing furfuryl alcohol, a caustic alkali and carbon disulphide to react in the presence of an inert diluent to yield a product which contains a substantial quantity of a xanthate.

11. The process which consists in causing furfuryl alcohol, a caustic alkali and carbon disulphide to react in the presence of an inert ether to yield a product which contains a substantial quantity of a xanthate.

CORNELIUS H. KELLER.